United States Patent [19]

Fattouche et al.

[11] Patent Number: 5,555,268
[45] Date of Patent: Sep. 10, 1996

[54] MULTICODE DIRECT SEQUENCE SPREAD SPECTRUM

[76] Inventors: Michel Fattouche, 156 Hawkwood Blvd N.W., Calgary, Alberta, Canada, T3G 2T2; Hatim Zaghloul, 402 - 1st Ave. N.E., Calgary, Alberta, Canada, T2E 0B4

[21] Appl. No.: 186,784

[22] Filed: Jan. 24, 1994

[51] Int. Cl.$^6$ ............................ H04B 1/707; H04B 1/69
[52] U.S. Cl. ........................ 375/206; 375/200; 380/34; 370/19; 370/21; 370/22
[58] Field of Search ............................ 375/1, 200–210; 380/34, 46; 370/18, 19, 20, 21, 22, 23, 24; 331/78; 364/717

[56] References Cited

U.S. PATENT DOCUMENTS

| | | | |
|---|---|---|---|
| 4,928,310 | 5/1990 | Goutzoulis et al. | 380/46 |
| 4,933,952 | 6/1990 | Albrieux et al. | 375/1 |
| 4,944,009 | 7/1990 | Micali et al. | 380/46 |
| 5,235,614 | 8/1993 | Bruckert et al. | 375/1 |

*Primary Examiner*—Bernarr E. Gregory
*Attorney, Agent, or Firm*—Frank J. Dykas

[57] ABSTRACT

In this patent, we present MultiCode Direct Sequence Spread Spectrum (MC-DSSS) which is a modulation scheme that assigns up to N DSSS codes to an individual user where N is the number of chips per DSSS code. When viewed as DSSS, MC-DSSS requires up to N correlators (or equivalently up to N Matched Filters) at the receiver with a complexity of the order of $N^2$ operations. In addition, a non ideal communication channel can cause InterCode Interference (ICI), i.e., interference between the N DSSS codes. In this patent, we introduce new DSSS codes, which we refer to as the "MC" codes. Such codes allow the information in a MC-DSSS signal to be decoded in a sequence of low complexity parallel operations which reduce the ICI. In addition to low complexity decoding and reduced ICI. MC-DSSS using the MC codes has the following advantages: (1) it does not require the stringent synchronization DSSS requires, (2) it does not require the stringent carrier recovery DSSS requires and (3) it is spectrally efficient.

32 Claims, 20 Drawing Sheets

MULTICODE DIRECT SEQUENCE SPREAD SPECTRUM

FIELD OF THE INVENTION

The invention deals with the field of multiple access communications using Spread Spectrum modulation. Multiple access can be classified as either random access, polling, TDMA, FDMA, CDMA or any combination thereof. Spread Spectrum can be classified as Direct Sequence, Frequency-Hopping or a combination of the two.

BACKGROUND OF THE INVENTION

Commonly used spread spectrum techniques are Direct Sequence Spread Spectrum (DSSS) and Code Division Multiple Access (CDMA) as explained in Chapter 8 of "Digital Communication" by J. G. Proakis, Second Edition, 1991, McGraw Hill, DSSS is a communication scheme in which information bits are spread over code bits (generally called chips). It is customary to use noise-like codes called pseudo random noise (PN) sequences. These PN sequences have the property that their auto-correlation is almost a delta function and their cross-correlation with other codes is almost null. The advantages of this information spreading are:

1. The transmitted signal can be buried in noise and thus has a low probability of intercept.
2. The receiver can recover the signal from interferers (such as other transmitted codes) with a jamming margin that is proportional to the spreading code length.
3. DSSS codes of duration longer than the delay spread of the propagation channel can lead to multipath diversity implementable using a Rake receiver.
4. The FCC and the DOC have allowed the use of unlicensed low power DSSS systems of code lengths greater than or equal to 10 in some frequency bands (the ISM bands).

It is the last advantage (i.e., advantage 4. above) that has given much interest recently to DSSS.

An obvious limitation of DSSS systems is the limited throughput they can offer. In any given bandwidth, B, a code of length N will reduce the effective bandwidth to B/N. To increase the overall bandwidth efficiency, system designers introduced Code Division Multiple Access (CDMA) where multiple DSSS communication links can be established simultaneously over the same frequency band provided each link uses a unique code that is noise-like. CDMA problems are:

1. The near-far problem: a transmitter "near" the receiver sending a different code than the receiver's desired code produces in the receiver a signal comparable with that of a "far" transmitter sending the desired code.
2. Synchronization of the receiver and the transmitter is complex (especially) if the receiver does not know in advance which code is being transmitted.

SUMMARY OF THE INVENTION

We have recognized that low power DSSS systems complying with the FCC and the DOC regulations for the ISM bands would be ideal communicators provided the problems of CDMA could be resolved and the throughput could be enhanced. To enhance the throughput, we allow a single link (i.e., a single transceiver) to use more than one code at the same time. To avoid the near-far problem only one transceiver transmits at a time. In this patent, we present Multi-Code Direct Sequence Spread Spectrum (MC-DSSS) which is a modulation scheme that assigns up to N codes to an individual transceiver where N is the number of chips per DSSS code. When viewed as DSSS, MC-DSSS requires up to N correlators (or equivalently up to N Matched Filters) at the receiver with a complexity of the order of $N^2$ operations. When N is large, this complexity is prohibitive. In addition, a nonideal communication channel can cause InterCode Interference (ICI), i.e., interference between the N DSSS codes at the receiver. In this patent, we introduce new codes, which we refer to as "MC" codes. Such codes allow the information in a MC-DSSS signal to be decoded in a sequence of low complexity parallel operations while reducing the ICI. In addition to low complexity decoding and ICI reduction, our implementation of MC-DSSS using the MC codes has the following advantages:

1. It does not require the stringent synchronization DSSS requires. Conventional DSSS systems requires synchronization to within a fraction of a chip whereas MC-DSSS using the MC codes requires synchronization to within two chips.
2. It does not require the stringent carrier recovery DSSS requires. Conventional DSSS requires the carrier at the receiver to be phase locked to the received signal whereas MC-DSSS using the MC codes does not require phase locking the carriers. Commercially available crystals have sufficient stability for MC-DSSS.
3. It is spectrally efficient.

sym(2,k) ... sym(N,k)] is the kth information-bearing vector d(k)=[c(1,k) d(2,k) ... d(N,k)] is the kth MC-DSSS frame v(k)=[v(1,k) v(2,k) ... v((1+β)MN,k)], β∈(0,1), M=1,2,3 ... and X(k)=[x(1k) x(2,k)], Z=Z=1, 2, 3, ....

Figure 7:
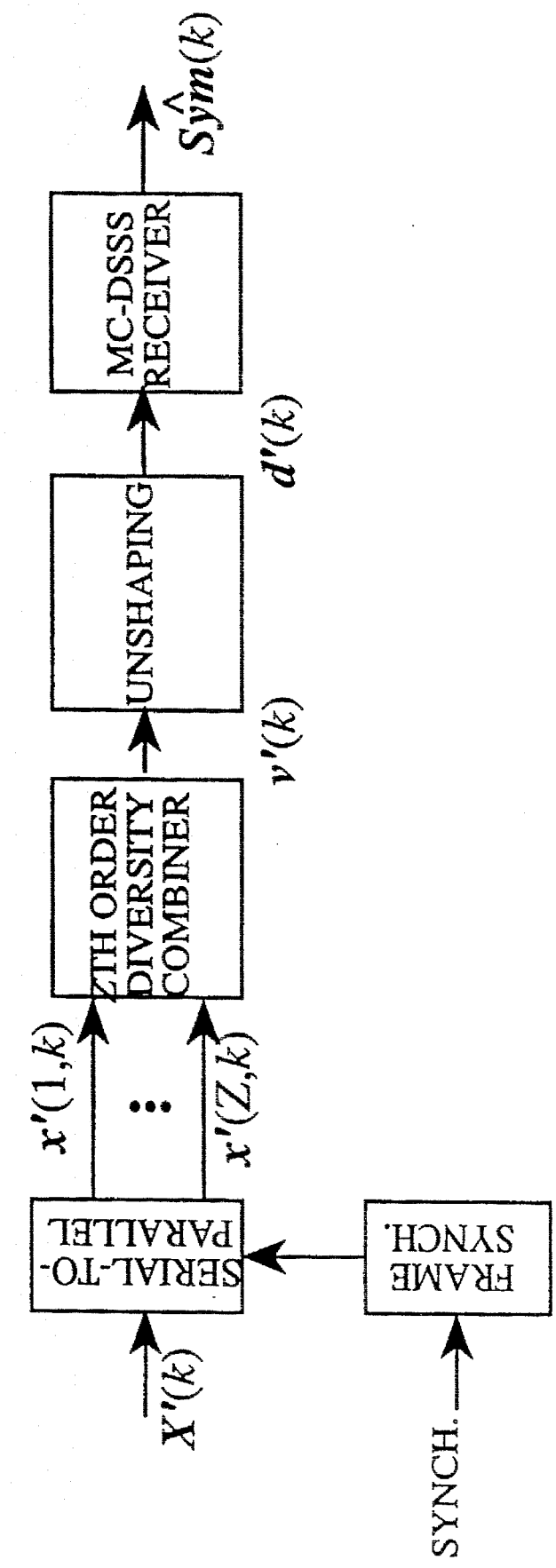

FIG. 7 is a schematic showing the Baseband Receiver for the kth received Data Frame X'(k) where Sym̂(N)= [sym̂(1,k)] sym̂(2,k) ... sym̂(N,k)] is the estimate of the kth information-bearing vector d'(k)=[d'(1,k) d'(2k) ... d'(N,K)] is the kth received MC-DSSS frame v'(k)=[v'(1,k) v(2k) ... v'((1+β) MN,k)], B∈(0,1), M=1,2,3, ... and X'(k)=[x'(1,k) x'(2,k) ... r'(Z,k)], Z=1,2,3, ....

Figure 8:
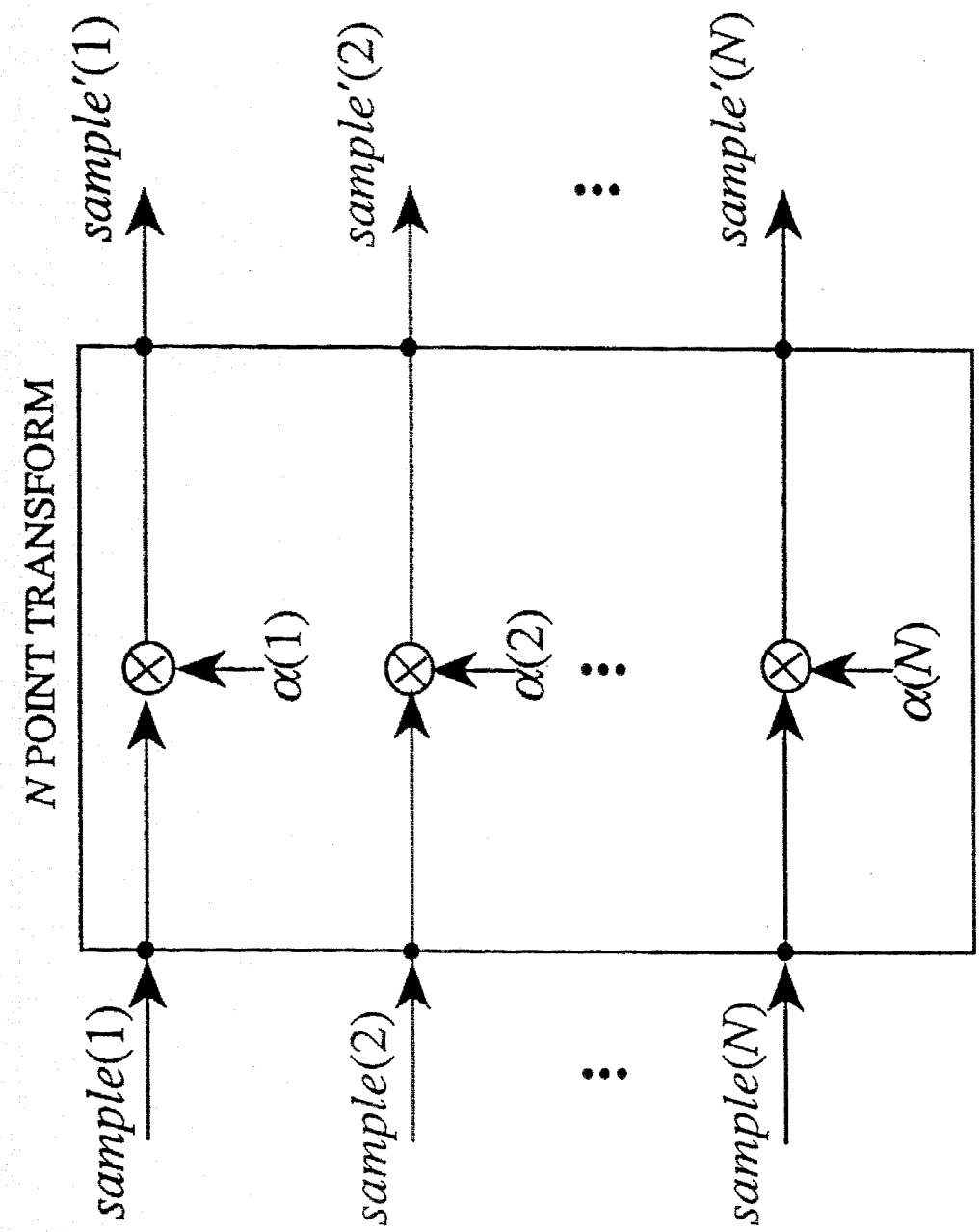

FIG. 8 is a schematic showing the Randomizer Transform (RT) where a (1) a (2) ... a (N) are complex constants chosen randomly.

Figure 9:
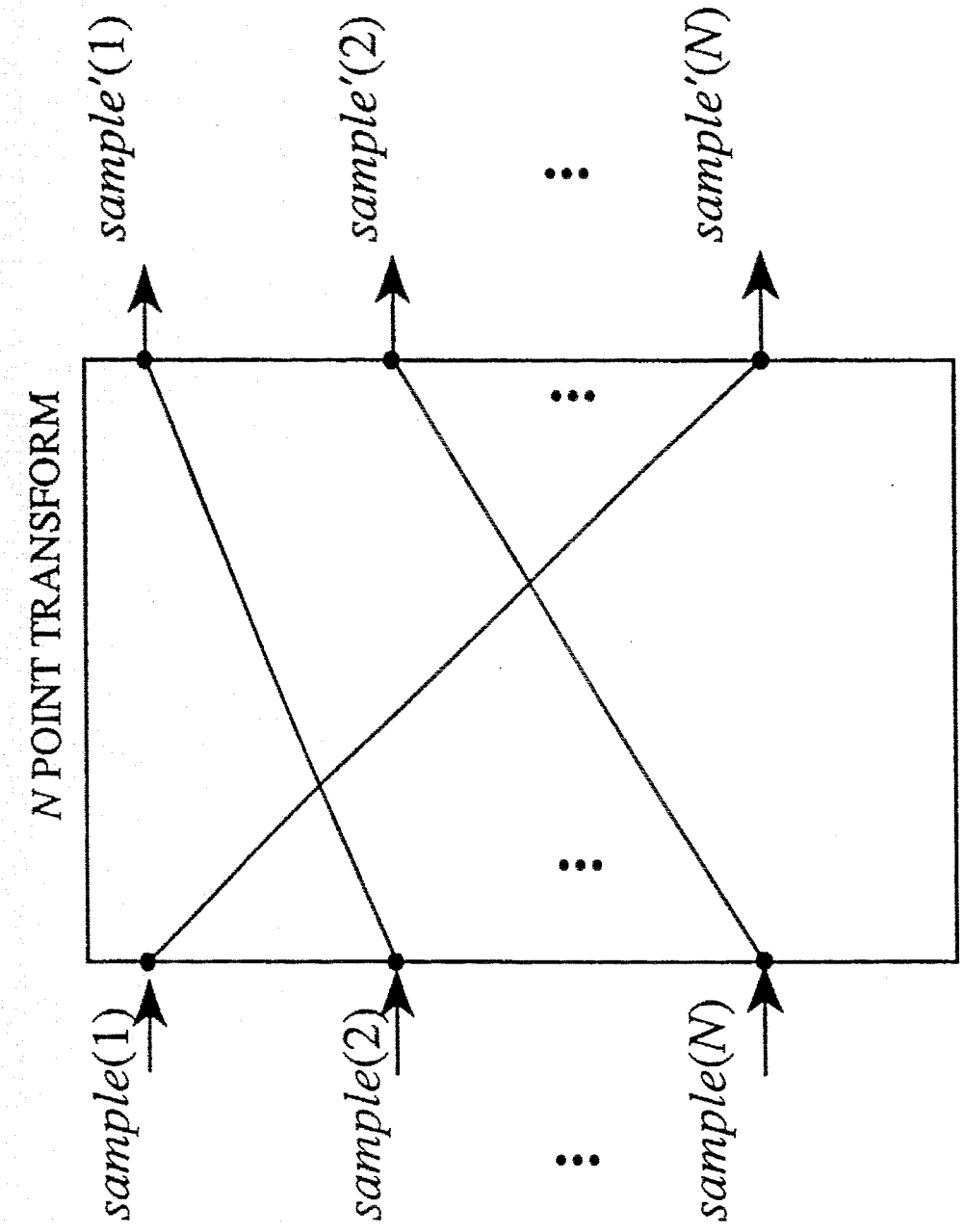

FIG. 9 is a schematic showing the Permutation Transform (PT).

Figure 10:
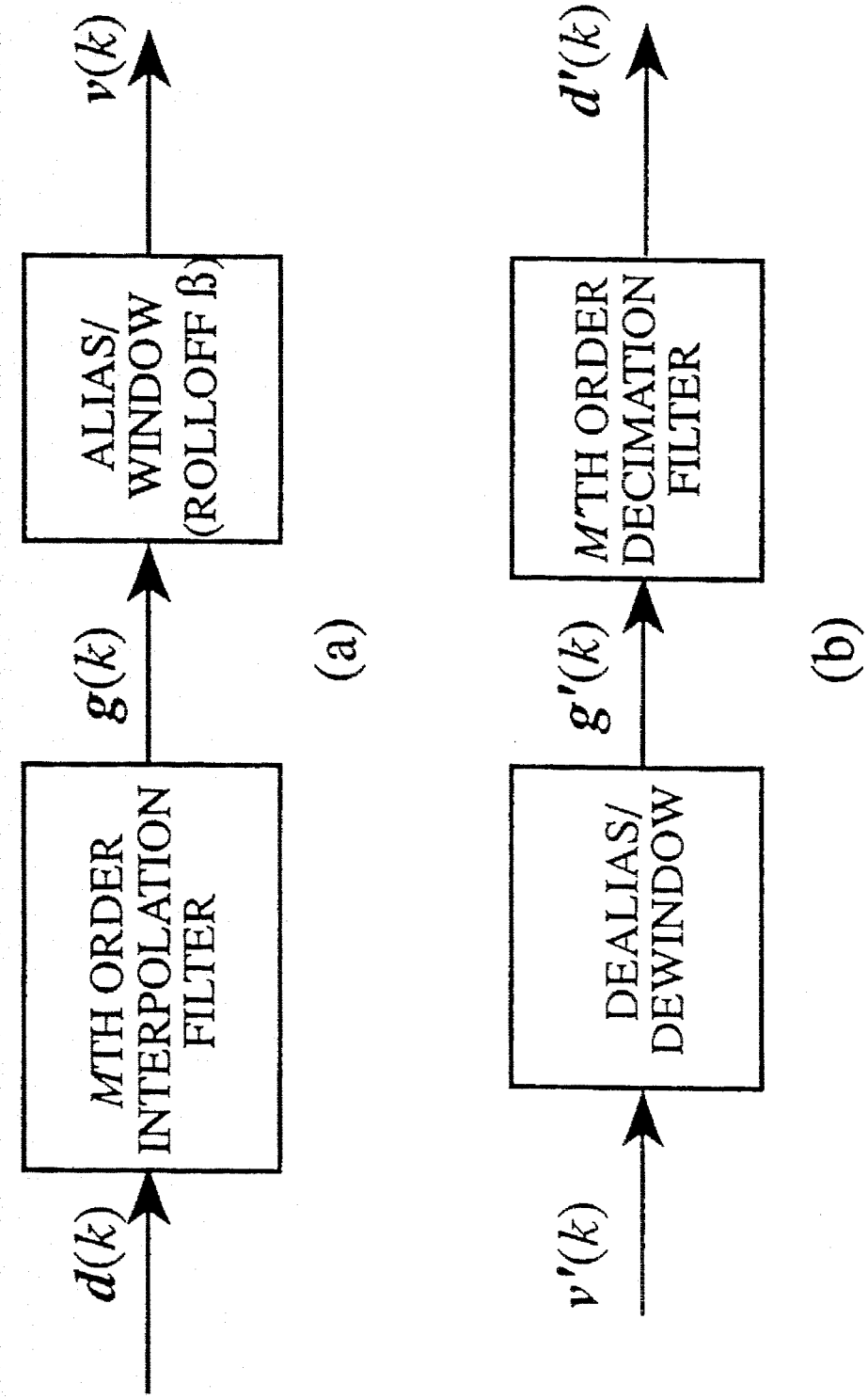

FIG. 10 is a schematic showing (a) the shaping of a MC-DSSS frame and (b) the unshaping of a MC-DSSS frame where d(k)=[d(1,k) d(2,k) ... d(N,k)] is the kth MC-DSSS frame g(k)=[g(1,k) g(2k) ... g(MN,k)], M=1,2,3, ..., v(k)=[v(1,k) v(2,k) ... v((1+β) MN,k)], B∈(0,1) d'(k)=[d(1,k) d(2,k) ... d(N,K)] is the kth received MC-DSSS frame g'(k)=[g'(1,k) g'(2,k) ... g'(M'N,k)] and v'(k)= [v(1,k) v'(2,k) ... v'((1+β) M'N,k)], M'=1,2,3, ...

Figure 11:
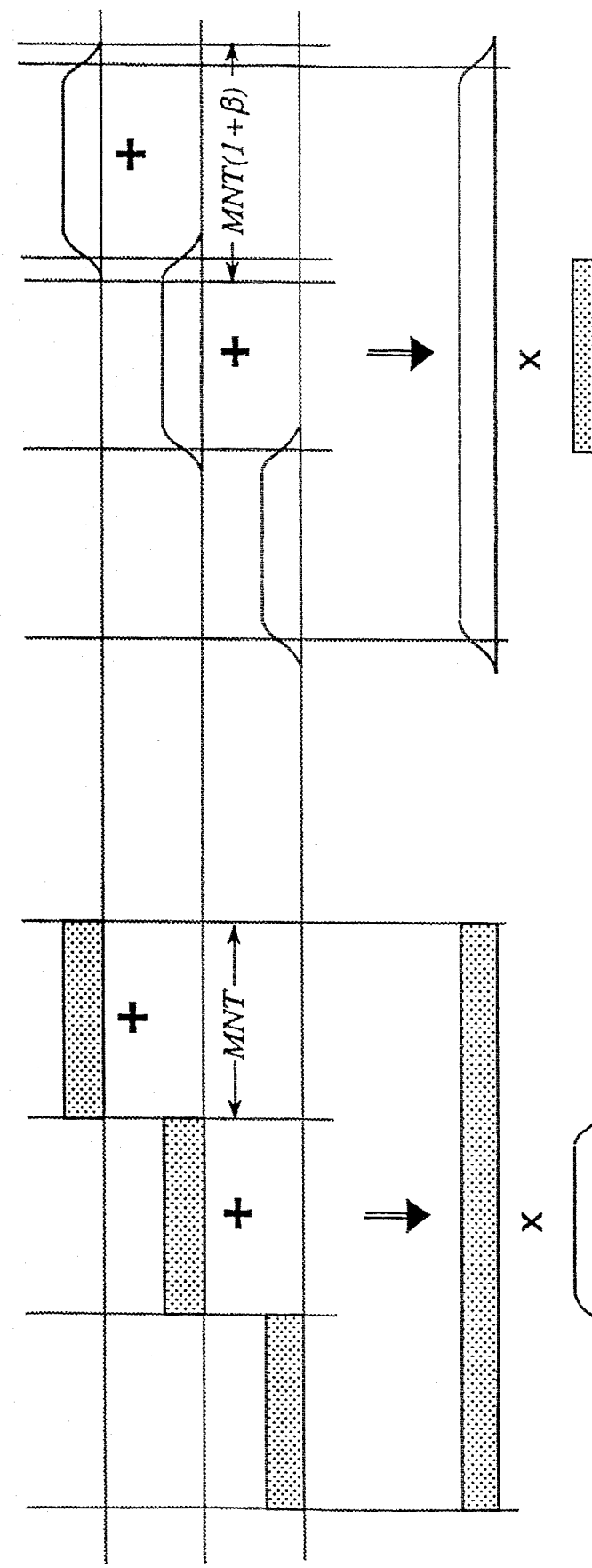

FIG. 11 is a schematic showing (a) Description of the alias/window operation (b) Description of dealias/dewindow operation, where 1/T is the symbol rate.

Figure 12:
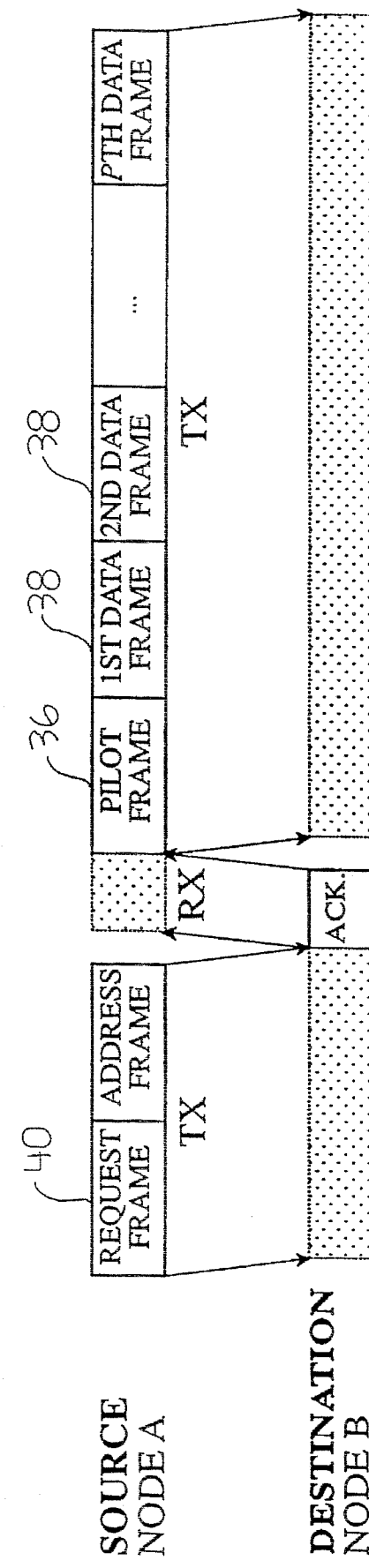

FIG. 12 is a schematic showing the frame structure for data transmission from source (Node A) to destination (Node B).

Figure 13:
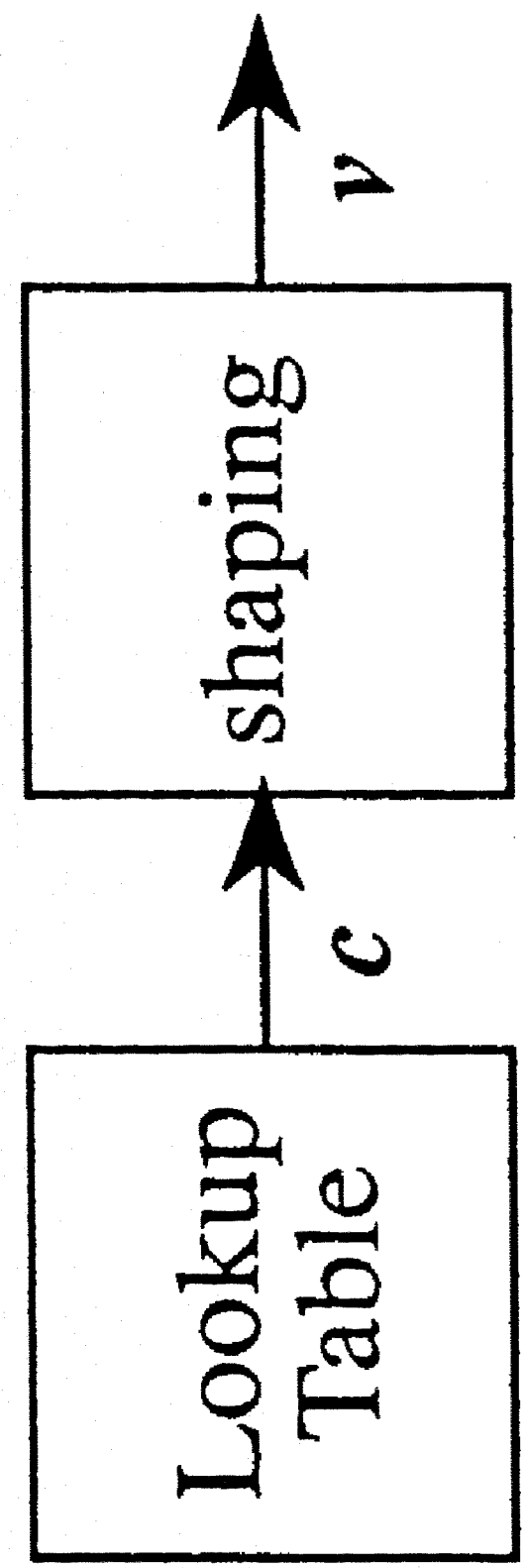

FIG. 13 is a schematic showing the baseband transmitter for one request frame v where c=[c(1) c(2) ... c(1)] is the DSSS code, v=[v(1) v(2) ... v((1+β)MI)], β∈(0,1), M=1,2, ... and I is the length of the DSSS code.

Figure 14:
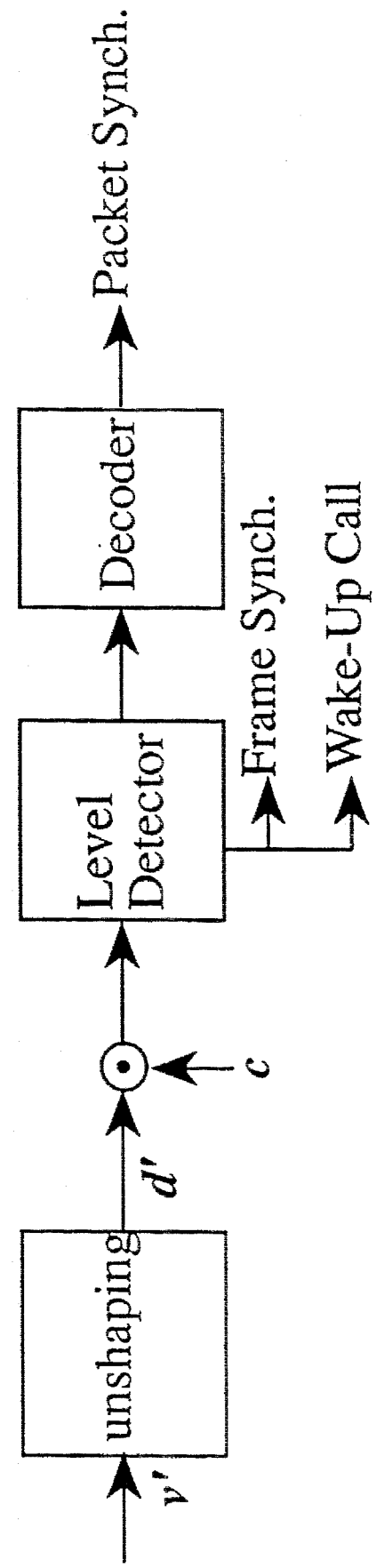

FIG. 14 is a schematic showing the baseband receiver for the received request frame where c=[c(1) c(2) ... c(1)] is the DSSS code for the request frame, d'=[d(1) d(2) ... d(1)] is the received request frame, v'=[v'(1) v'((1+β) MI)], β∈(0,1), M=1,2, ... and l is the length of the DSSS code.

Figure 15:
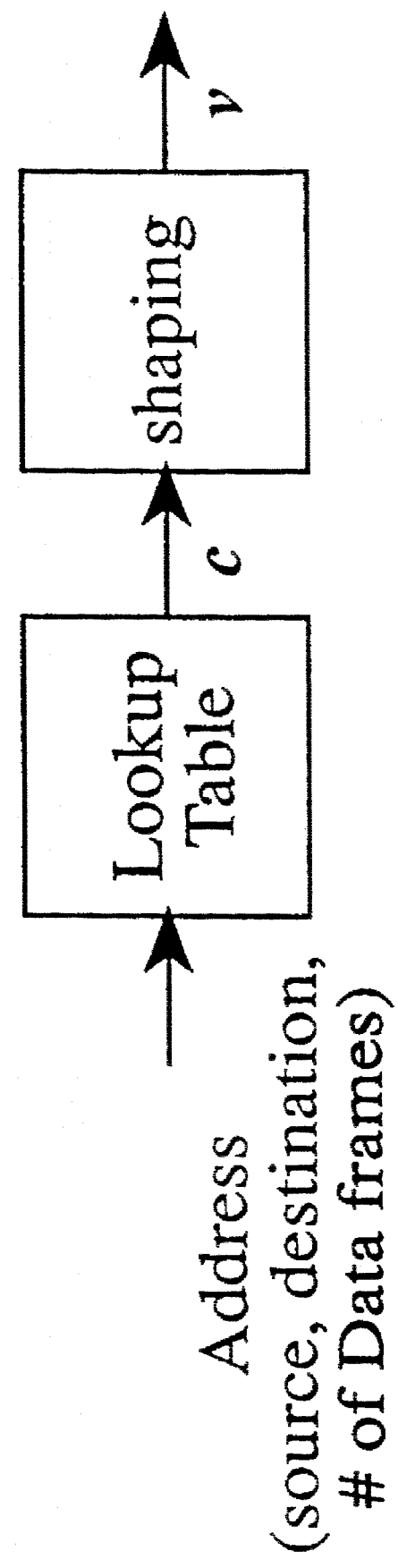

FIG. 15 is a schematic showing the baseband transmitter for one address frame where c=[c(1) c(2) ... c(1)] is the CDMA code for the address frame, v=[v(1) v(2) ... v(1+β) MI)], β∈(0,1), M=1,2, ... and l' is the length of the CDMA code.

Figure 16:
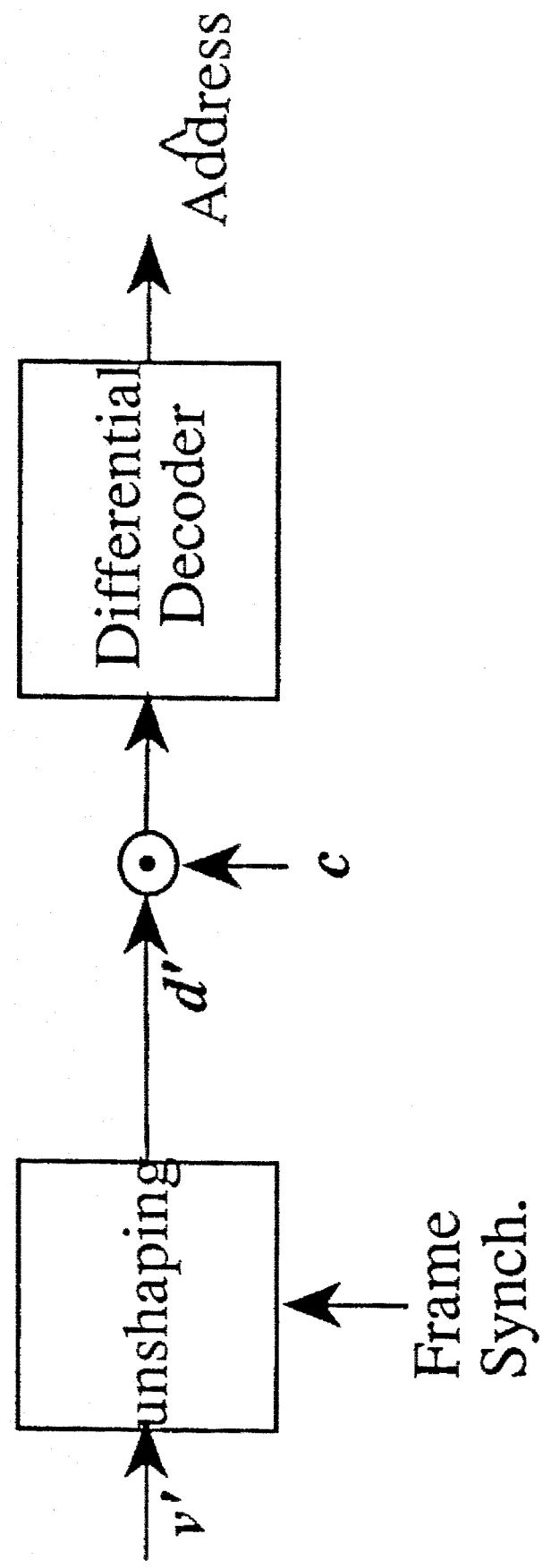

FIG. 16 is a schematic showing the baseband receiver the address where c=[c(1) c(2) ... c(I')] is the CDMA code for the address frame, d'=[d(1) d(2) ... d(I)] is the received address frame, v'=[v'(1) v'(2) ... v'((1+β) MI')], β∈(0,1), M=1,2, ... and I' is the length of the CDMA code.

Figure 17:
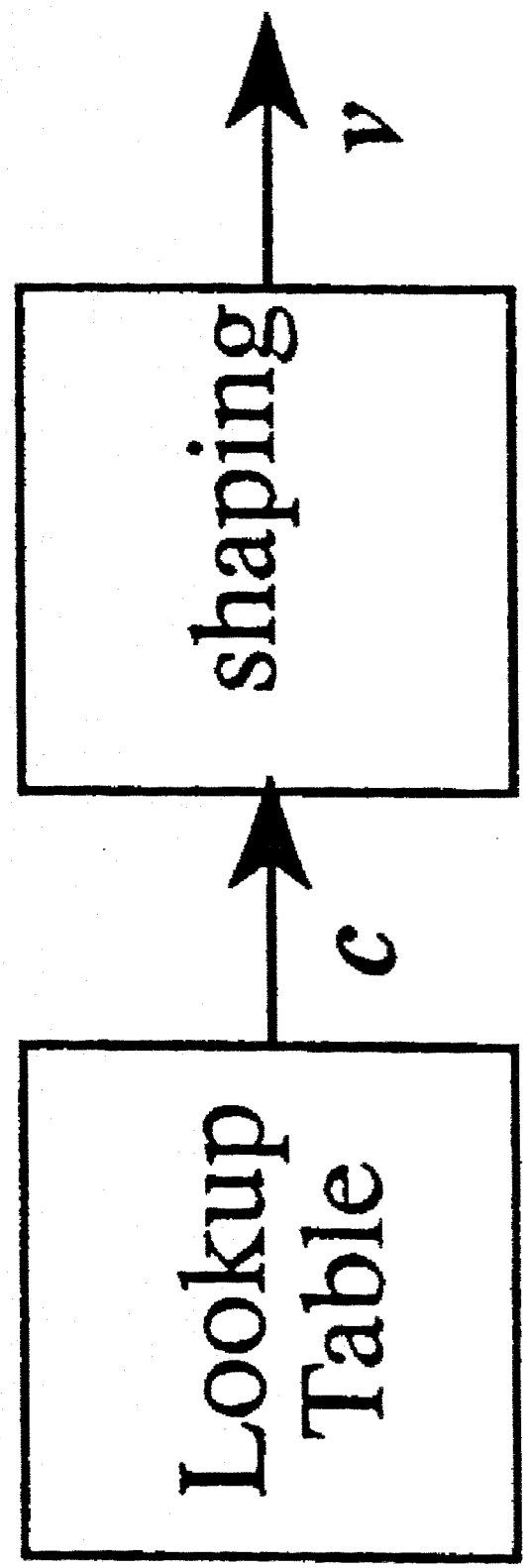

FIG. 17 is a schematic showing the baseband transmitter for Ack. Frame where c=[c(1) c(2) ... c(I')] is the DSSS code for the Ack. frame, v=[v(1) v(2) ... v((1+β) MI')] β∈(0,1), M=1,2,3, ... and I' is the length of the DSSS code.

Figure 18:
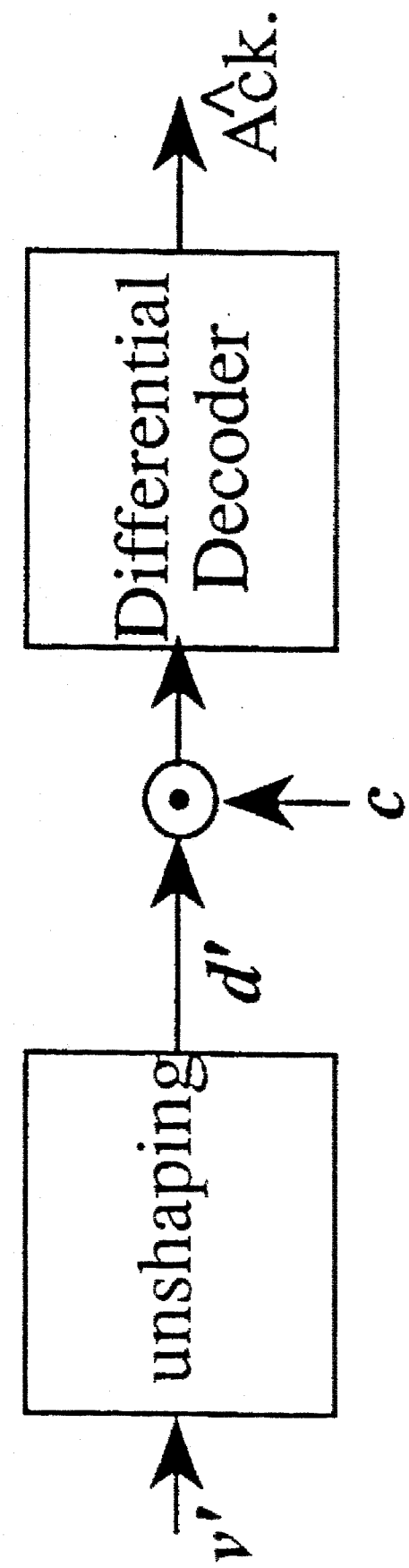

FIG. 18 is a schematic showing the baseband receiver for the ack. frame where c=[c(1) c(2) ... c(I'')] is the DSSS code for the Ack. frame, d'=[d(1) d(2) ... d'(I'')] is the received Ack. frame, v'=[v'(1) v(2) ... v'(1+β) MI'')], β∈(0,1), M=1,2, ... and I'' is the length of the DSSS code.

Figure 19:
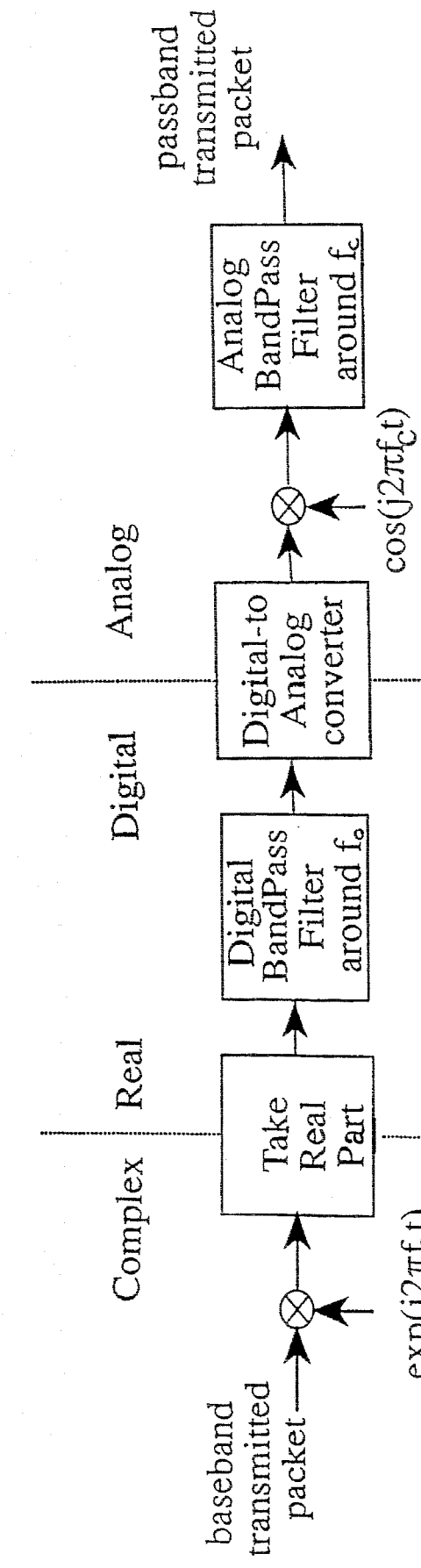

FIG. 19 is a schematic showing the passband transmitter for a packet where $f_o$ is the IF frequency and $f_o+f_c$ is the RF frequency.

Figure 20:
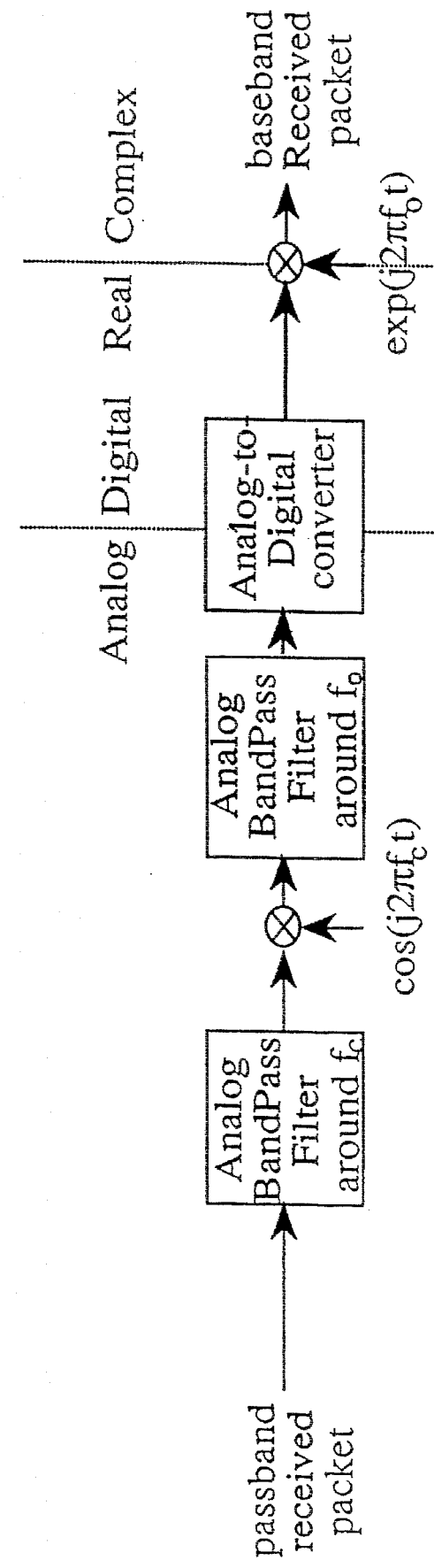

FIG. 20 is a schematic showing the passband receiver for a packet where $f_o$ is the IF frequency and $f_o+f_c$ is the RF frequency.

DETAILED DESCRIPTION OF THE PREFERRED EMBODIMENTS OF THE INVENTION

Figure 1:
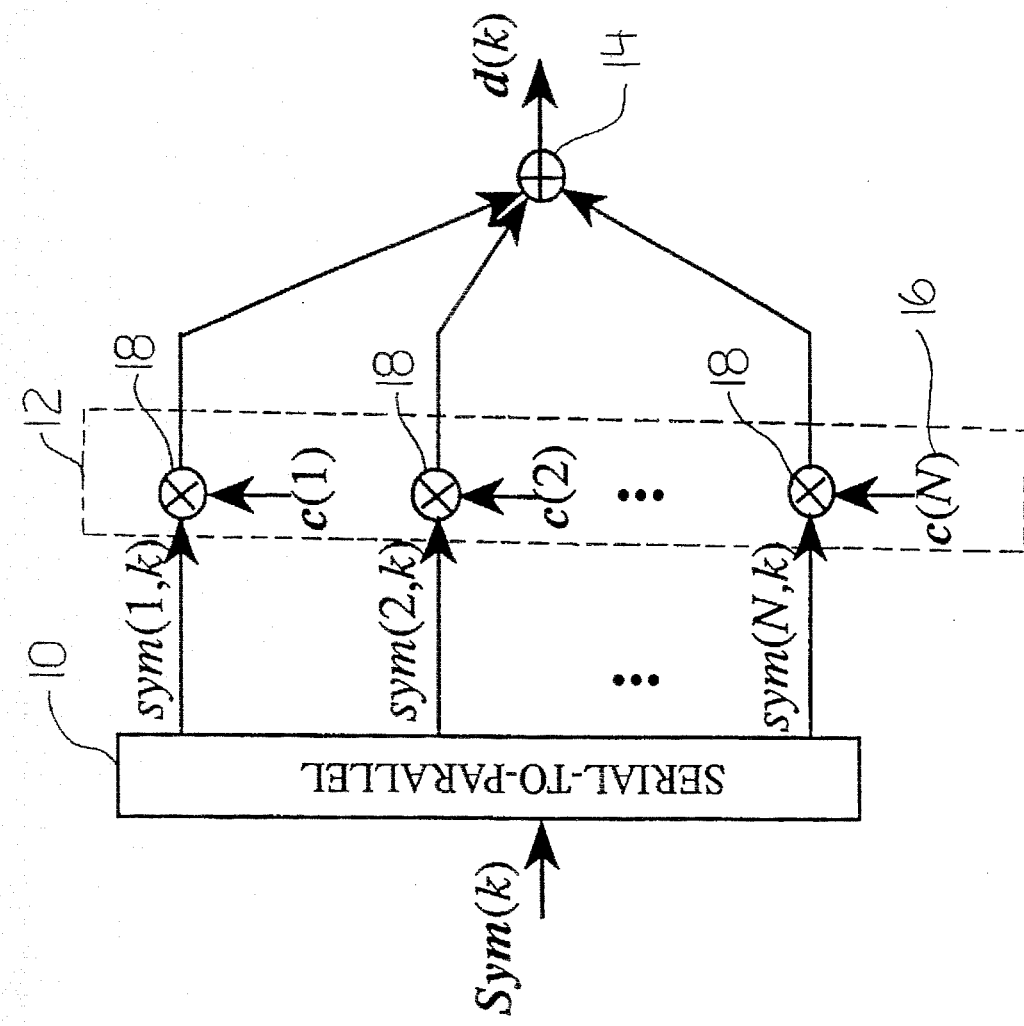
FIG. 1 is a schematic showing for the Baseband Transmitter for the xth MC-DSSS frame: d(k)=[d(1,x) d(2,x) ... d(N,k)] where c(i)=[c(1,i) c(2,i)] is the ith code and Sym(k)=[sym(1,k) sym(N,k)] is the kth information-bearing vector containing N symbols.

FIG. 1 illustrates the transmitter of the MC-DSSS modulation technique generating the kth MC-DSSS frame bearing N symbols of information. The symbols can be either analog or digital.

A converter 10 converts a stream of data symbols into plural sets of N data symbols each. A computing means 12 operates on the plural sets of N data symbols to produce modulated data symbols corresponding to an invertible randomized spreading of the stream of data symbols. A combiner 14 combines the modulated data symbols for transmission. The computing means shown in FIG. 1 includes a source 16 of N direct sequence spread spectrum code symbols and a modulator 18 to modulate each ith data symbol from each set of N data symbols with the I code symbol from the N code symbol to generate N modulated data symbols, and thereby spread each I data symbol over a separate code symbol.

Figure 2:
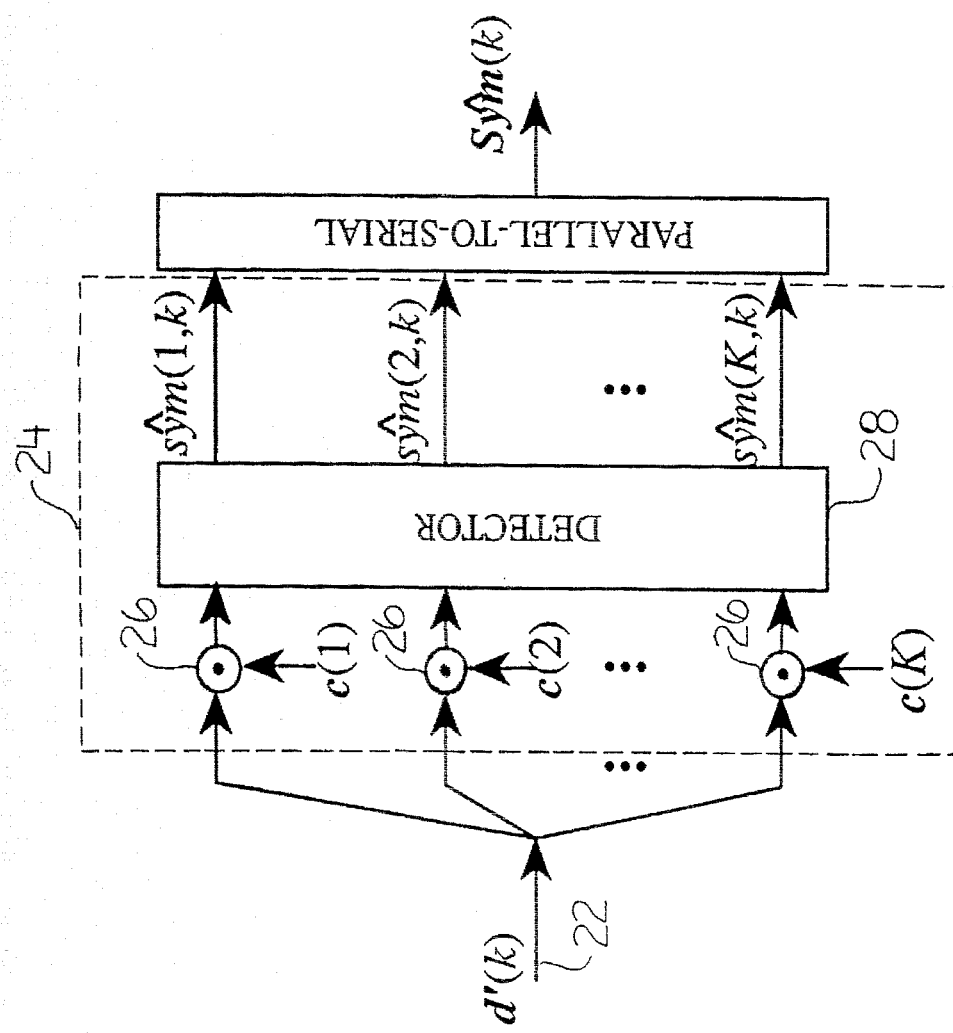
FIG. 2 is a schematic showing a Baseband Receiver for the kth received MC-DSSS frame: d'(k)=[d'(1,k) d'(2,k) ... d'(N,k)] where c(i)=[c(1,i) c(2,i) ... c(N,i)] is the ith code, Symˆ(k)=[symˆ(1,k) symˆ(2,k) ... symˆ(N,k)] is the estimate of the Kth information-bearing vector Sym(k) and $d'(k) \to \odot \to$ is a dot product defined as
$\uparrow$
$c(i)$
$d'(k) \odot c(i) = c(1,i)d'(1,k) = c(2,i)d'(2,k) + \ldots + c(N,i)d'(N,N).$

FIG. 2 illustrates the receiver of the MC-DSSS modulation techniques accepting the kth MC-DSSS frame and generating estimates for the corresponding N symbols of information. The dot product in FIG. 2 can be implemented as a correlator. The detector can make either hard decisions or soft decisions.

Figure 4:
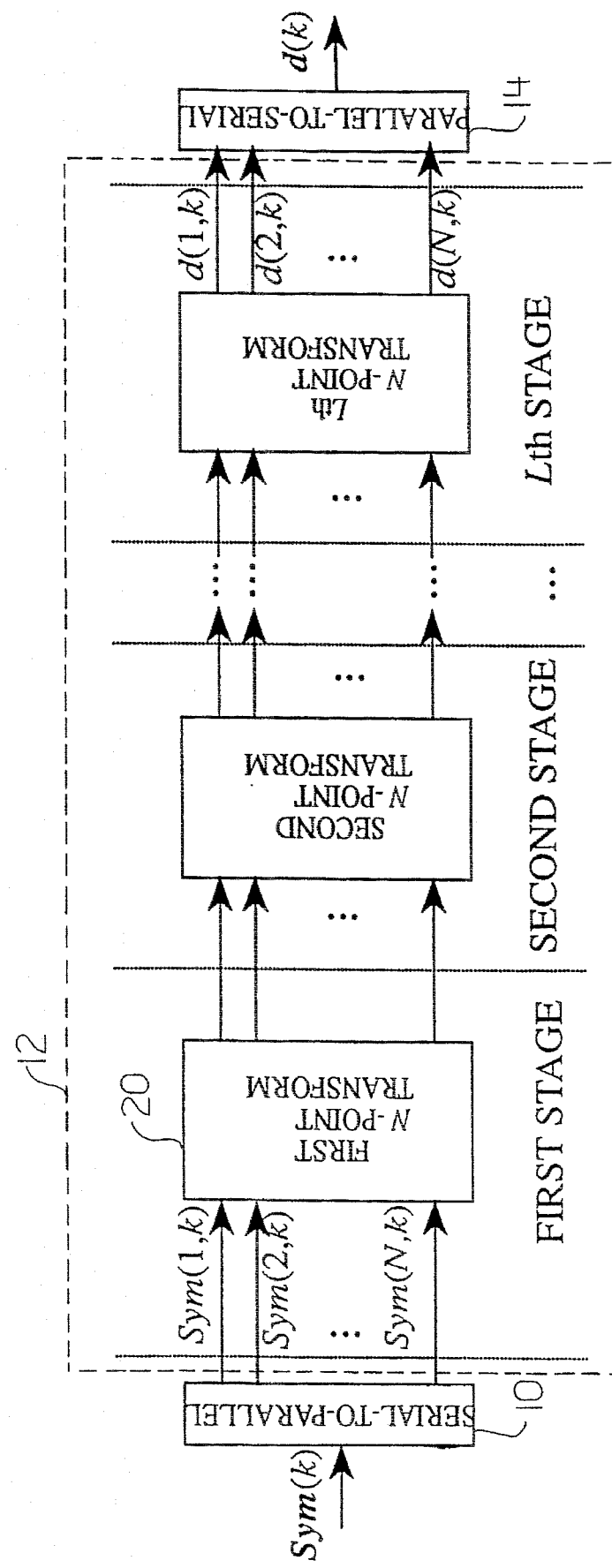
FIG. 4 is a schematic showing the alternate transmitter for the kth MC-DSSS frame: d(k)=[d(1,k), d(2,k) ... d(N,k)] using the MC codes generated in FIG. 3 where Sym(k)=[Sym(1,k)Sym(2k) ... Sym(N,k)] is the kth information-bearing vector contacting N symbols.

A sequence of modulated data symbols is received at 22 in which the sequence of modulated data symbols has been generated by the transmitter such as is shown in FIG. 1 or 4. A second computing means 24 operates on the sequence of modulated data symbols to produce an estimate of the second string of data symbols. The computing means 24 shown in FIG. 2 includes a correlator 26 for correlating each I modulated data symbol from the received sequence of modulated data symbols with the I code symbol from the set of N code symbols and a detector 28 for detecting an estimate of the data symbols from output of the correlator 26.

Figure 3:
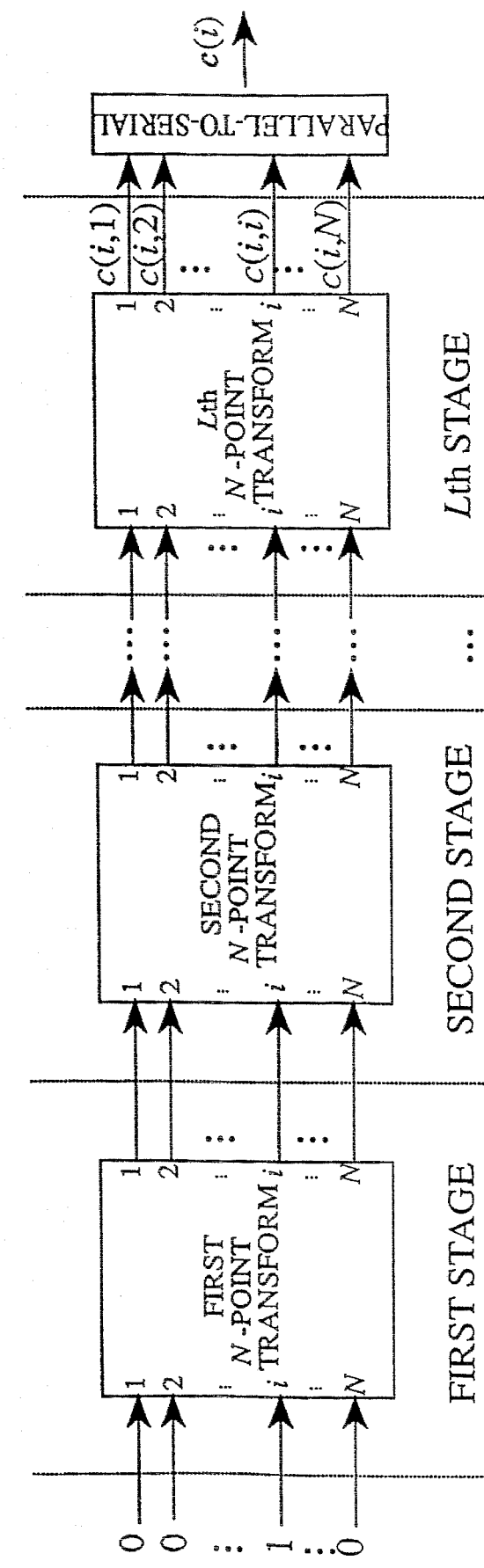
FIG. 3 is a schematic showing of the ith MC code c(i)=[c(i,1) c(i,2) ... c(i,NO) where i can take one of the N values: 1,2, ... N corresponding to the position of the single '1' at the input of the first N-point transform.

FIG. 3 illustrates the code generator of the MC codes. Any one of the P N-point transforms in FIG. 3 consists of a reversible transform to the extent of the available arithmetic precision. In other words, with finite precision arithmetic, the transforms are allowed to add a limited amount of irreversible error.

One can use the MC-DSSS transmitter in FIG. 1 and the MC-DSSS receiver in FIG. 2 together with the MC codes generated using the code generator in FIG. 3 in order to implement MC-DSSS using the MC codes.

An alternative transmitter to the one in FIG. 1 using the MC codes in FIG. 3 is shown in FIG. 4.

The alternative transmitter shown in FIG. 4 includes a transformer 20 for operating on each set of N data symbols to generate N modulated data symbols as output. A series of transforms are shown.

Figure 5:
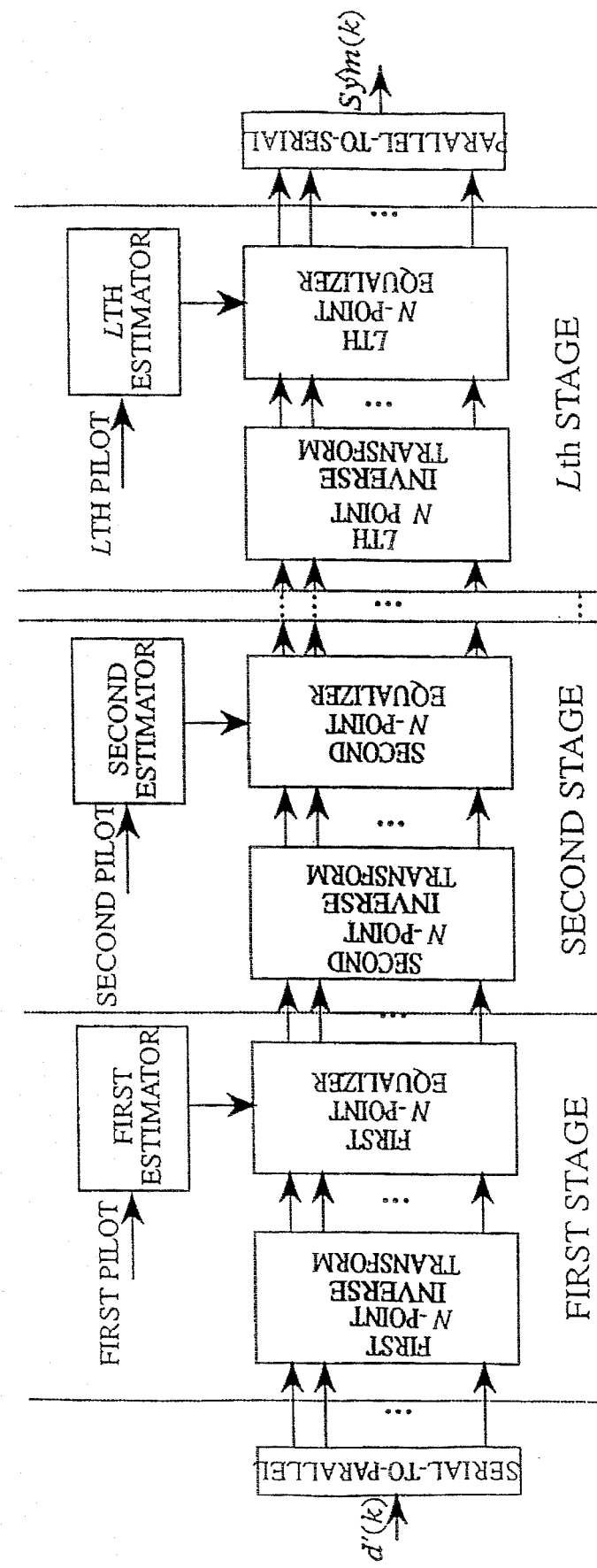
FIG. 5 is the alternate receiver for the kth received MC-DSSS frame d'(k)=[d'(1k)d'(2,K) ...d'(N,k)] using MC codes generated in FIG. 3 where Symˆ(k)=[symˆ(1,k) symˆ(2k) ... symˆ(N,k)] is the estimate of the information-bearing vetor Sym(k).

An alternative receiver to the one in FIG. 2 using the MC codes in FIG. 3 is shown in FIG. 5. L pilots are required in FIG. 5 for equalization.

Figure 6:
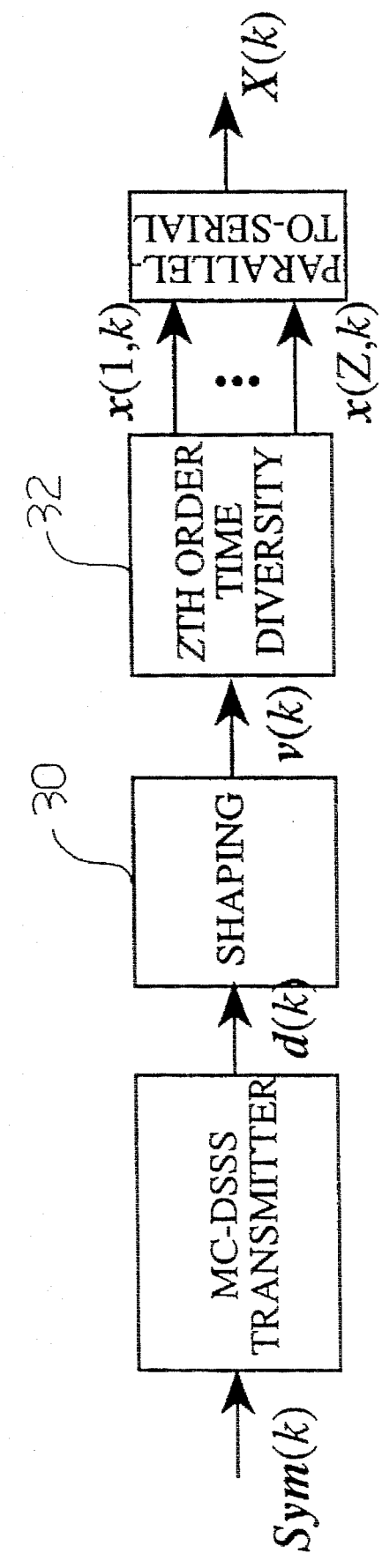
FIG. 6 is a schematic showing the Baseband Transmitter of the kth Data Frame X(k) where Sym(N)=[sym(1,k)

Both transmitters in FIGS. 1 and 4 allow using shaper 30 in diversity module 32 shaping and time diversity of the MC-DSSS signal as shown in FIG. 6. We will refer to the MC-DSSS frame with shaping and time diversity as a Data frame.

Both receivers in FIGS. 2 and 5 allow diversity combining followed by the unshaping of the Data frame as shown in FIG. 7. A Synch. is required in FIG. 7 for frame synchronization.

In addition to the Data frames, we need to transmit (1) all of the L pilots used in FIG. 5 to estimate and equalize for the various types of channel distortions, (2) the Synch. signal used in FIG. 7 for frame synchronization, and (3) depending on the access technique employed, the source address, destination address and number of Data frames. We will refer to the combination of all transmitted frames as a packet.

PREFERRED EMBODIMENTS OF THE INVENTION

Examples of the N-point transforms in FIG. 3 are a Discrete Fourier Transform (DFT), a Fast Fourier Transform (FFT), a Walsh Transform (WT), a Hilbert Transform (HT), a Randomizer Transform (RT) as the one illustrated in FIG. 8, a Permutator Transform (PT) as the one illustrated in FIG. 9, an Inverse DFT (IDFT), an Inverse FFT (IFFT), an Inverse WT (IWT), an Inverse HT (IHT), an Inverse RT (IRT), an Inverse PT (IPT), and any other reversible transform. When L=2 with the first N-point transform being a DFT and the second being a RT, we have a system identical to the patent: "Method and Apparatus for Multiple Access between Transceivers in Wireless Communications using OFDM Spread Spectrum" by M. Fattouche and H. Zaghloul, filed in the U.S. Pat. Office in Mar. 31, 1992, Ser. No. 07/861,725.

Preferred shaping in FIG. 6 consists of an Mth order interpolation filter followed by an alias/window operation as shown in FIG. 10a. The Alias/window operation is described in FIG. 11a where a raised-cosine pulse of rolloff β is applied. The interpolation filter in FIG. 10a can be implemented as an FIR filter or as an NM-point IDFT where the first N(M-1)/2 points and the last N(M-1)/2 points at the input of the IDFT are zero. Preferred values of M are 1,2,3 and 4.

Preferred unshaping in FIG. 7 consists of a dealias/dewindow operation followed by a decimation filter as shown in FIG. 10b. The dealias/dewindow operation is described in FIG. 11b.

Time Diversity in FIG. 6 can consist of repeating the MC-DSSS frame several times. It can also consist of repeating the frame several times then complex conjugating some of the replicas, or shifting some of the replicas in the frequency domain in a cyclic manner.

Diversity combining in FIG. 7 can consist of cophasing, selective combining, Maximal Ratio combining or equal gain combining.

In FIG. 5, L pilots are used to equalize the effects of the channel on each information-bearing data frame. The pilot frames can consist of Data frames of known information symbols to be sent either before, during or after the data, or of a number of samples of known values inserted within two transformations in FIG. 4. A preferred embodiment of the pilots is to have the first pilot consisting of a number of frames of known information symbols. The remaining pilots can consist of a number of known information symbols between two transforms. The L estimators can consist of averaging of the pilots followed by either a parametric estimation or a nonparametric one similar to the channel estimator in the patent: "Method and Apparatus for Multiple Access between Transceivers in Wireless Communications using OFDM Spread Spectrum" by M. Fattouche and H. Zaghloul, filed in the U.S. Pat. Office in Mar. 31, 1992, Ser. No. 07/861,725.

When Node A intends to transmit information to Node B, a preferred embodiment of a packet is illustrated in FIG. 12: a Request frame 40, an Address frame, an Ack. frame, a Pilot frame 36 and a number of Data frames 38. The Request frame is used (1) as a wake-up call for all the receivers in the band, (2) for frame synchronization and (3) for packet synchronization. It can consist of a DSSS signal using one PN code repeated a number of times and ending with the same PN code with a negative polarity. FIGS. 13 and 14 illustrate the transmitter and the receiver for the Request frame respectively. In FIG. 14, the dot product operation can be implemented as a correlator with either hard or soft decision (or equivalently as a filter matched to the PN code followed by a sample/hold circuit). The Request frame receiver is constantly generating a signal out of the correlator. When the signal is above a certain threshold using the level detector, (1) a wake-up call signal is conveyed to the portion of the receiver responsible for the Address frame and (2) the frames are synchronized to the wake-up call. The packet is then synchronized to the negative differential correlation between the last two PN codes in the Request frame using a decoder as shown in FIG. 14.

The Address frame can consist of a CDMA signal where one out of a number of codes is used at a time. The code consists of a number of chips that indicate the destination address, the source address and/or the number of Data frames. FIGS. 15 and 16 illustrate the transmitter and the receiver for the Address frame respectively. Each receiver differentially detects the received Address frame, then correlates the outcome with it is own code. If the output of the correlator is above a certain threshold, the receiver instructs its transmitter to transmit an Ack. Otherwise, the receiver returns to its initial (idle) state.

The Ack. frame is a PN code reflecting the status of the receiver, i.e. whether it is busy or idle. When it is busy, Node A aborts its transmission and retries some time later. When it is idle, Node A proceeds with transmitting the Pilot frame and the Data frames. FIGS. 17 and 18 illustrate the transmitter and the receiver for the Address frame respectively.

An extension to the MC-DSSS modulation technique consists of passband modulation where the packet is up-converted from baseband to RF in the transmitter and later down-converted from RF to baseband in the receiver. Passband modulation can be implemented using IF sampling which consists of implementing quadrature modulation/demodulation in an intermediate Frequency between baseband and RF, digitally as shown in FIGS. 19 and 20 which illustrate the transmitter and the receiver respectively. IF sampling trades complexity of the analog RF components (at either the transmitter, the receiver or both) with complexity of the digital components. Furthermore, in passband systems carrier feed-through is often a problem implying that the transmitter has to ensure a zero dc component. Such a component reduces the usable bandwidth of the channel. In IF sampling the usable band of the channel does not include dc and therefore is the dc component is not a concern.

A further extension to the MC-DSSS modulation technique consists of using antenna Diversity in order to improve the Signal-to-Ratio level at the receiver. A preferred combining technique is maximal selection combining based on the level of the Request frame at the receiver.

We claim:

1. A transceiver for transmitting a first stream of data symbols, the transceiver comprising:

a converter for converting the first stream of data symbols into plural sets of N data symbols each;

first computing means for operating on the plural sets of N data symbols to produce modulated data symbols corresponding to an invertible randomized spreading of the first stream of data symbols; and means to combine the modulated data symbols for transmission.

2. The transceiver of claim 1 in which the first computing means includes:

a source of N direct sequence spread spectrum code symbols; and a modulator to modulate each ith data symbol from each set of N data symbols with the ith code symbol from the N code symbol to generate N modulated data symbols, and thereby spread each ith data symbol over a separate code symbol.

3. The transceiver of claim 2 in which the code symbols are generated by operation of a non-trivial N point transform on a sequence of input signals.

4. The transceiver of claim 1 in which the first computing means includes:

a transformer for operating on each set of N data symbols to generate N modulated data symbols as output, the N modulated data symbols corresponding to spreading of each ith data symbol over a separate code symbol.

5. The transceiver of claim 4 in which the transformer effectively applies a first transform selected from the group comprising a Fourier transform and a Walsh transform to the N data symbols.

6. The transceiver of claim 5 in which the first transform is a Fourier transform and it is followed by a randomizing transform.

7. The transceiver of claim 6 in which the first transform is a Fourier transform and it is followed by a randomizing transform and a second transform selected from the group comprising a Fourier transform and Walsh transform.

8. The transceiver of claim 4 in which the transformer effectively applies a first inverse transform selected from the group comprising a randomizer transform, a Fourier transform and a Walsh transform to the N data symbols, followed by a first equalizer and a second inverse transform selected from the group comprising a Fourier transform and a Walsh transform.

9. The transceiver of claim 8 in which the second transform is followed by a second equalizer.

10. The transceiver of claim 1 further including:

means for receiving a sequence of modulated data symbols, the modulated data symbols having been generated by invertible randomized spreading of a second stream of data symbols second computing means for operating on the sequence of modulated data symbols to produce an estimate of the second stream of data symbols.

11. The transceiver of claim 10 further including means to apply diversity to the modulated data symbols before transmission, and means to combine received diversity signals.

12. The transceiver of claim 10 in which the second computing means includes:

a correlator for correlating each ith modulated data symbol from the received sequence of modulated data symbols with the ith code symbol from the set of N code symbols; and a detector for detecting an estimate of the data symbols from output of the correlator.

13. The transceiver of claim 10 in which the second computing means includes an inverse transformer for regenerating an estimate of the N data symbols.

14. The transceiver of claim 1 further including a shaper for shaping the combined modulated data symbols for transmission.

15. The transceiver of claim 1 further including means to apply diversity to the combined modulated data symbols before transmission.

16. The transceiver of claim 1 in which the N data symbols include a pilot frame and a number of data frames, and is preceded by a request frame, wherein the request frame is used to wake up receiving transceivers, synchronize reception of the N data symbols and convey protocol information.

17. A transceiver for transmitting a first stream of data symbols and receiving a second stream of data symbols, the transceiver comprising:

a converter for converting the first stream of data symbols into plural sets of N data symbols each;

first computing means for operating on the plural sets of N data symbols to produce sets of N modulated data symbols corresponding to an invertible randomized spreading of each set of N data symbols over N code symbols;

means to combine the modulated data symbols for transmission;

means for receiving a sequence of modulated data symbols, the modulated data symbols having been generated by an invertible randomized spreading of a second stream of data symbols over N code symbols;

second computing means for operating on the sequence of modulated data symbols to produce an estimate of the second stream of data symbols; and means to combine output from the second computing means.

18. The transceiver of claim 17 in which the first computing means includes:

a source of N direct sequence spread spectrum code symbols; and a modulator to modulate each ith data symbol from each set of N data symbols with the ith code symbol from the N code symbol to generate N modulated data symbols, and thereby spread each ith data symbol over a separate code symbol.

19. The transceiver of claim 18 in which the code symbols are generated by operation of plural non-trivial N point transforms on a random sequence of input signals.

20. The transceiver of claim 17 in which the first computing means includes:

a transformer for operating on each set of N data symbols to generate N modulated data symbols as output, the N modulated data symbols corresponding to spreading of each ith data symbol over a separate code symbol.

21. The transceiver of claim 17 in which the second computing means includes:

a correlator for correlating each ith modulated data symbol from the received sequence of modulated data symbols with the ith code symbol from the set of N code symbols; and a detector for detecting an estimate of the data symbols from the output of the correlator.

22. The transceiver of claim 17 in which the second computing means includes an inverse transformer for regenerating an estimate of the N data symbols.

23. A method of exchanging data streams between a plurality of transceivers, the method comprising the steps of:

converting a first stream of data symbols into plural sets of N data symbols each;

operating on the plural sets of N data symbols to produce modulated data symbols corresponding to a spreading of the first stream of data symbols over N code symbols;

combining the modulated data symbols for transmission; and transmitting the modulated data symbols from a first transceiver at a time when no other of the plurality of transceivers is transmitting.

24. The method of claim 23 in which the spreading is an invertible randomized spreading and operating on the plural sets of N data symbols includes modulating each ith data symbol from each set of N data symbols with the ith code symbol from the N code symbols to generate N modulated data symbols, and thereby spread each ith data symbol over a separate code symbol.

25. The method of claim 23 in which the spreading is an invertible randomized spreading and operating on the plural sets of N data symbols includes:

transforming, by application of a transform, each set of N data symbols to generate N modulated data symbols as output.

26. The method of claim 25 in which transforming each set of N data symbols includes applying to each set of N data symbols a randomizing transform and a transform selected from the group comprising a Fourier transform and a Walsh transform.

27. The method of claim 25 in which transforming each set of N data symbols includes applying to each set of N data symbols a Fourier transform, a randomizing transform and a transform selected from the group comprising a Fourier transform and a Walsh transform.

28. The method of claim 25 in which transforming each set of N data symbols includes applying to each set of N data symbols a first transform selected from the group comprising a Fourier transform and a Walsh transform, a randomizing transform and a second transform selected from the group comprising a Fourier transform and a Walsh transform.

29. The method of claim 23 further including the step of:

receiving, at a transceiver distinct from the first transceiver, the sequence of modulated data symbols; and operating on the sequence of modulated data symbols to produce an estimate of the first stream of data symbols.

30. The method of claim 29 in which operating on the sequence of modulated data symbols includes the steps of:

correlating each ith modulated data symbol from the received sequence of modulated data symbols with the ith code symbol from the set of N code symbols; and detecting an estimate of the first stream of data symbols from output of the correlator.

31. The method of claim 23 further including shaping the modulated data symbols before transmission.

32. The method of claim 23 further including applying diversity to the modulated data symbols before transmission.

* * * * *